United States Patent
Kordahi et al.

(10) Patent No.: US 6,424,761 B1
(45) Date of Patent: Jul. 23, 2002

(54) CABLE REPEATER CONNECTING JOINT

(75) Inventors: Maurice Kordahi, Atlantic Highland; William Girzone, Bradley Beach, both of NJ (US)

(73) Assignee: TyCom (US) Inc., Morristown, NJ (US)

(*) Notice: Subject to any disclaimer, the term of this patent is extended or adjusted under 35 U.S.C. 154(b) by 0 days.

(21) Appl. No.: 09/766,704

(22) Filed: Jan. 22, 2001

(51) Int. Cl.[7] .................................................. G02B 6/36
(52) U.S. Cl. ............................ 385/25; 385/70; 385/100; 439/8
(58) Field of Search .............................. 439/6, 7, 8, 9, 439/31; 174/86; 385/25, 70, 100

(56) References Cited

U.S. PATENT DOCUMENTS 4,757,157 A   7/1988  Pelet ........................... 174/50
5,018,980 A * 5/1991  Robb ............................. 439/8
5,110,224 A   5/1992  Taylor et al. ................. 385/25

FOREIGN PATENT DOCUMENTS

JP          9258082       10/1997      ............ G02B/6/46

* cited by examiner

Primary Examiner—Brian Sircus
Assistant Examiner—Michael C. Zarroli

(57) ABSTRACT

A connector for a cable repeater includes a repeater including a joint having two mutually perpendicular and intersecting axes of rotation at one end thereof. A coupling includes a joint having two mutually perpendicular and intersecting axes of rotation. A first connecting link is pivotally connected at a first end thereof to the repeater joint and secured at a second end thereof to the coupling. A second connecting link is pivotally connected at a first end thereof to the coupling joint and secured at a second end thereof to a length of optical fiber cable. In preferred embodiments, a bend limiting device is provided at the end of the length of cable, with the second connecting link being secured at its second end to the bend limiting device.

21 Claims, 3 Drawing Sheets

CABLE REPEATER CONNECTING JOINT

CROSS REFERENCE TO RELATED APPLICATION

This application is related to U.S. patent application Ser. No. 09/669,638, filed Sep. 26, 2000, and entitled "Multi-Body Modular Repeater System and Articulated Housing for Use Therein", and which is hereby incorporated by reference herein.

FIELD OF INVENTION

The present invention is directed to joints connecting cable repeaters to lengths of fiber optic cable, and, more particularly, to a connecting joint for a cable repeater having improved bending capability.

BACKGROUND

Fiber optic cable laid undersea is typically required to traverse great distances. Cable repeaters are well known to be placed in-line at desired intervals along the cable to receive, amplify, and retransmit the signal being carried by the cable. A bend limiting device, having a rubber boot, is typically secured to the end of the cable. The repeater is connected to the bend limiting device, with connecting optical fibers extending through the bend limiting device. To deploy the fiber optic cable, it is coiled onto large drums on a ship. Consequently, the repeaters become wrapped about the drums along with the cable. Due to the nature of the signals, and the ever increasing amount of information being transmitted in the optical fibers, repeaters are getting larger, and their increased length creates problems as they are coiled around a drum. Although the drums may be up to 9–12 feet in diameter, current repeaters may approach 5½ feet in length, and, therefore, are not able to lie flat, or even substantially flat, along a drum. Tremendous stresses due to forces on the order of up to 100,000 pounds are encountered at the connection point between the repeater and the fiber optic cable to which it is attached, especially during paying out and reeling in of the cable.

Consequently, a gimbal may be provided at each longitudinal end of the repeater, to which the bend limiting devices are attached. A gimbal, as used herein, refers to a device having two mutually perpendicular and intersecting axes of rotation. A gimbal provides free angular movement in two directions. The bend angle allowed by the gimbal between the repeater and bend limiting device is limited to approximately 50° or less as exceeding this angle at a pivot point can damage the optical fibers.

A repeater for attachment to a fiber optic cable and its end connecting structure as known in the prior art are shown in FIG. 1. Repeater 2 has a cone 5 enclosing each end thereof (only one end is shown for simplicity), and a gimbal 4 contained within cone 5. Gimbal 4 is formed of a first ring 6 secured to the cone 5 of the repeater 2. A second ring 8 sits within and is pivotally connected to first ring 6 by a pair of coaxial pins 10, only one of which is visible in the drawing. The axes of pins 10 are perpendicular to a longitudinal axis L of repeater 2. A connecting link 12 is pivotally connected at a first end thereof to the second ring 8 by a pair of coaxial pins 14, only one of which is visible. The common axis of pins 14 extend perpendicular to the common axis of pins 10, and pins 14 move in a plane which is perpendicular to the common axis of pins 10 as ring 8 pivots about pins 10. Connecting link 12 is connected at its second end to a bend limiting device 16. A bend limiting device 16 is located at the end of a boot 19 proximate the repeater 2. The end of a segment of a fiber optic cable 17, excluding the optical fibers thereof, is attached to and housed within the boot 19, as seen in FIG. 3. Optical fibers (not shown) extend through the connecting link 12 to carry signals to the repeater 2. The bend limiting device 16 prevents the relative rotation between the repeater 2 and the boot 19 from exceeding a predetermined maximum bend angle a by abutting with the first ring 6 or another part of the gimbal 4 when the predetermined maximum bend angle α is reached. This in turn prevents the fibers from becoming damaged. A commonly used maximum bend angle α between the longitudinal axis L of repeater 2 and the longitudinal axis B of bend limiting device 16 allowed by gimbal 4 is approximately 50°, thereby limiting the ability to wrap repeater 2, and fiber optic cable 17 to which it is attached, around a drum for effective deployment.

It is an object of the present invention to provide a cable repeater connecting joint which reduces or wholly overcomes some or all of the aforesaid difficulties inherent in prior known devices. Particular objects and advantages of the invention will be apparent to those skilled in the art, that is, those who are knowledgeable or experienced in this field of technology, in view of the following disclosure of the invention and detailed description of preferred embodiments.

SUMMARY

The principles of the invention may be used to provide a cable repeater connecting joint having improved bending capability for fiber optic cable systems. A repeater is connected by a pair of joints and a coupling to a bend limiting boot assembly. In a preferred arrangement, each of the joints have two mutually perpendicular and intersecting axes of rotation. The bend limiting boot assembly encloses an end of a length of cable. Such a connecting system increases the ability to wrap the cable with its attached in-line repeater and associated structure around a drum by reducing the critical bend angle without sacrificing strength or exceeding any predetermined optical fiber bend limits.

In accordance with a first aspect, a connector for connecting a cable repeater to a length of cable includes a cable repeater having a joint. The cable repeater joint has two mutually perpendicular and intersecting axes of rotation. A coupling has a joint having two mutually perpendicular and intersecting axes of rotation. A first connecting link is pivotally connected at a first end thereof to the cable repeater joint and secured at a second end thereof to the coupling. A second connecting link is pivotally connected at a first end thereof to the coupling joint and secured at a second end thereof to a length of cable.

In accordance with another aspect, a connector for connecting a cable repeater to a length of cable includes a cable repeater having a first gimbal. A coupling has a second gimbal. A first connecting link is pivotally connected at a first end thereof to the first gimbal and secured at a second end thereof to the coupling. A second connecting link is pivotally connected at a first end thereof to the second gimbal and secured at a second end thereof to a length of cable.

In accordance with yet another aspect, a cable system includes a plurality of repeaters. Each repeater has a repeater gimbal at each end thereof. Each of a plurality of couplings has a coupling gimbal therein. The cable system also includes a plurality of first connecting links. Each first connecting link is pivotally connected at a first end thereof to a repeater gimbal and secured at a second end thereof to a coupling. A plurality of bend limiting devices is also provided. Each bend limiting device encloses an end of a length of cable. Each of a plurality of second connecting links is pivotally connected at a first end thereof to a coupling gimbal and secured at a second end thereof to a bend limiting device.

From the foregoing disclosure, it will be readily apparent to those skilled in the art, that is, those who are knowledgeable or experienced in this area of technology, that the present invention provides a significant advance. Preferred embodiments of the cable repeater connecting joint of the present invention can provide improved bending capability and, consequently, reduce the stress encountered as a repeater and cable to which it is attached are wrapped around a drum. These and additional features and advantages of the invention disclosed here will be further understood from the following detailed disclosure of preferred embodiments.

BRIEF DESCRIPTION OF THE DRAWINGS

Preferred embodiments are described in detail below with reference to the appended drawings wherein.

Figure 1:
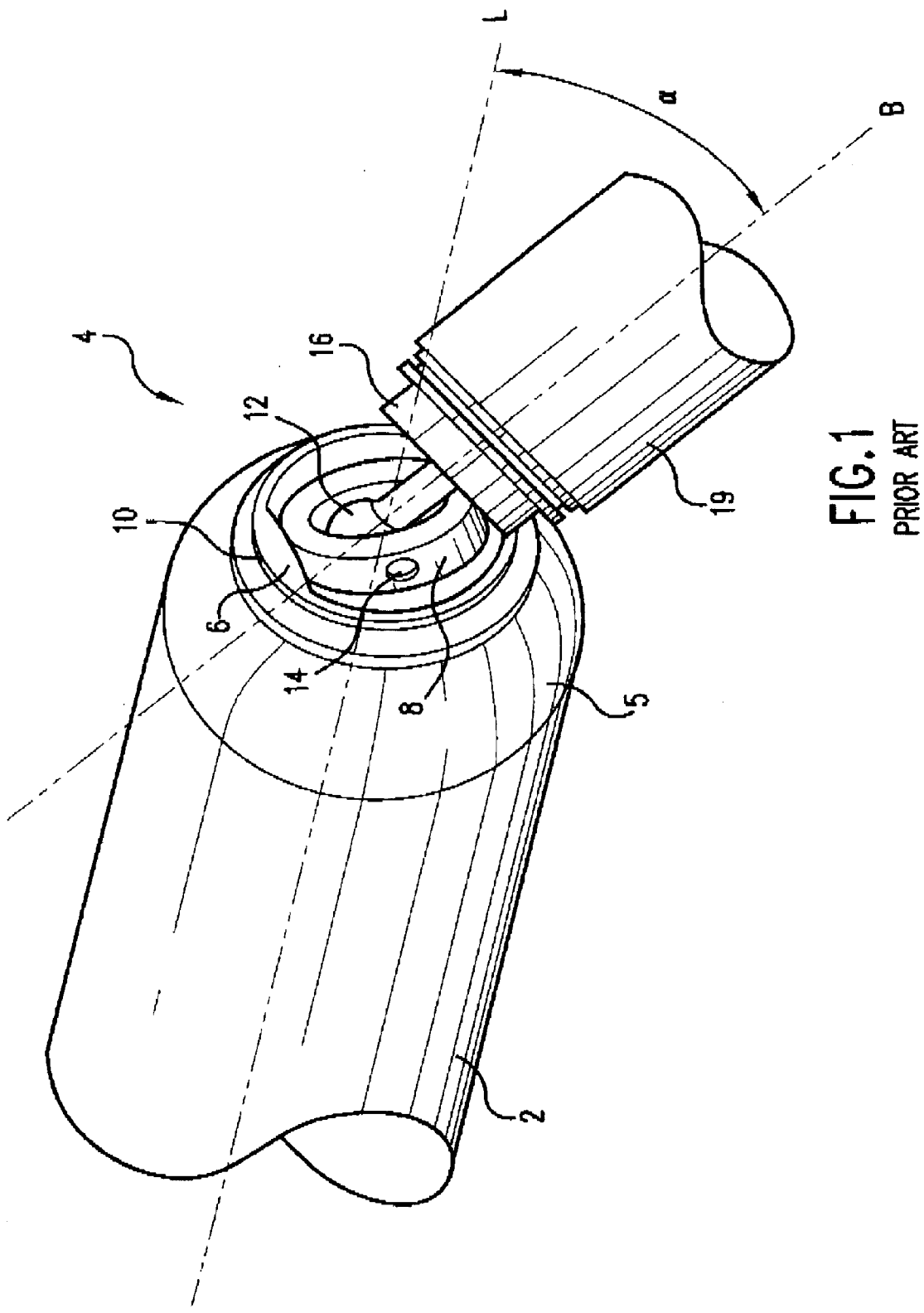
FIG. 1 is a diagrammatic perspective view of a cable repeater of the prior art connected to a bend limiting device with a gimbal.

The figures referred to above are not drawn necessarily to scale and should be understood to present a representation of the invention, illustrative of the principles involved. Some features of the cable repeater connecting joint depicted in the drawings have been enlarged or distorted relative to others to facilitate explanation and understanding. The same reference numbers are used in the drawings for similar or identical components and features shown in various alternative embodiments. Cable repeater connecting joints as disclosed herein, will have configurations and components determined, in part, by the intended application and environment in which they are used.

DETAILED DESCRIPTION OF PREFERRED EMBODIMENTS

Figure 2:
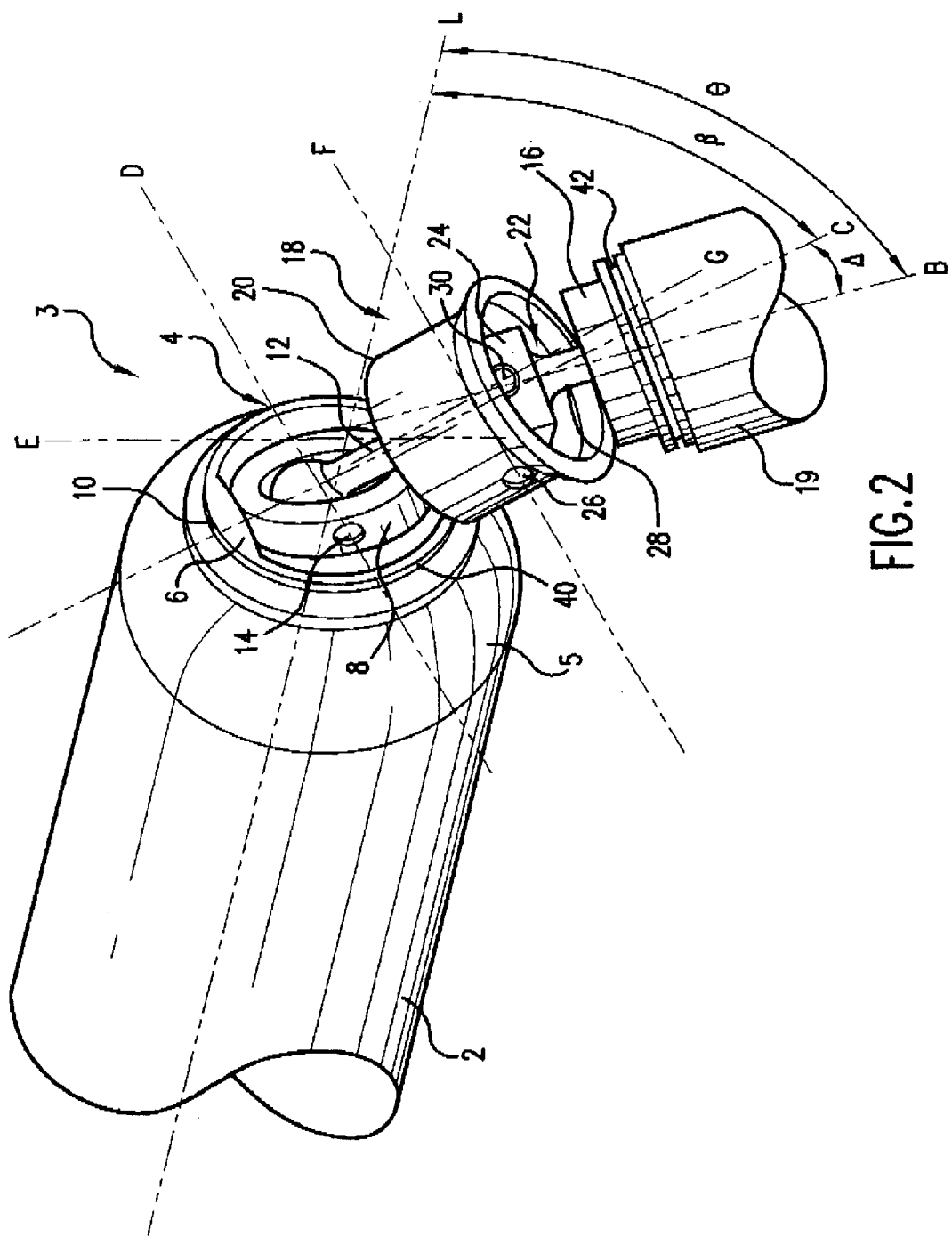
FIG. 2 is a diagrammatic perspective view of a connecting joint of the present invention shown connecting a cable repeater to a bend limiting device.

As shown in FIG. 2, a connecting joint 3 in accordance with the invention comprises a repeater 2 having a longitudinal axis L. A cone 5 encompasses each end of repeater 2, only one end of repeater 2 being shown here. In a preferred embodiment, connecting joint 3 includes a gimbal 4. A gimbal, as used herein, refers to a device having two mutually perpendicular and intersecting axes of rotation. A gimbal provides free angular movement within limits in two directions. Gimbal 4 is of conventional construction and is secured within cone 5 of repeater 2. It is to be appreciated that another gimbal 4 (not shown here) is located within the cone 5 at the other end of repeater 2. Gimbal 4 includes a first ring 6 secured within cone 5. A second ring 8 is pivotally connected to first ring 6 by a pivot axis structure, preferably a pair of pins 10, only one of which is visible in the drawing. Pins 10 are axially aligned with one another, each pin 10 extending through first and second rings 6, 8 on opposite sides of first and second rings 6, 8. A first connecting link 12 is pivotally connected at a first end thereof to second ring 8 by a pivot axis structure, preferably a pair of pins 14 coaxially positioned on opposite sides of second ring 8 and extending into first connecting link 12. The common axes of pins 14 extend perpendicular to the common axes of pins 10, and pins 14 move in a plane perpendicular to the axes of pins 10 as second ring 8 rotates about pins 10. The second end of first connecting link 12 is secured to a coupling 18 having a longitudinal axis C.

Figure 3:
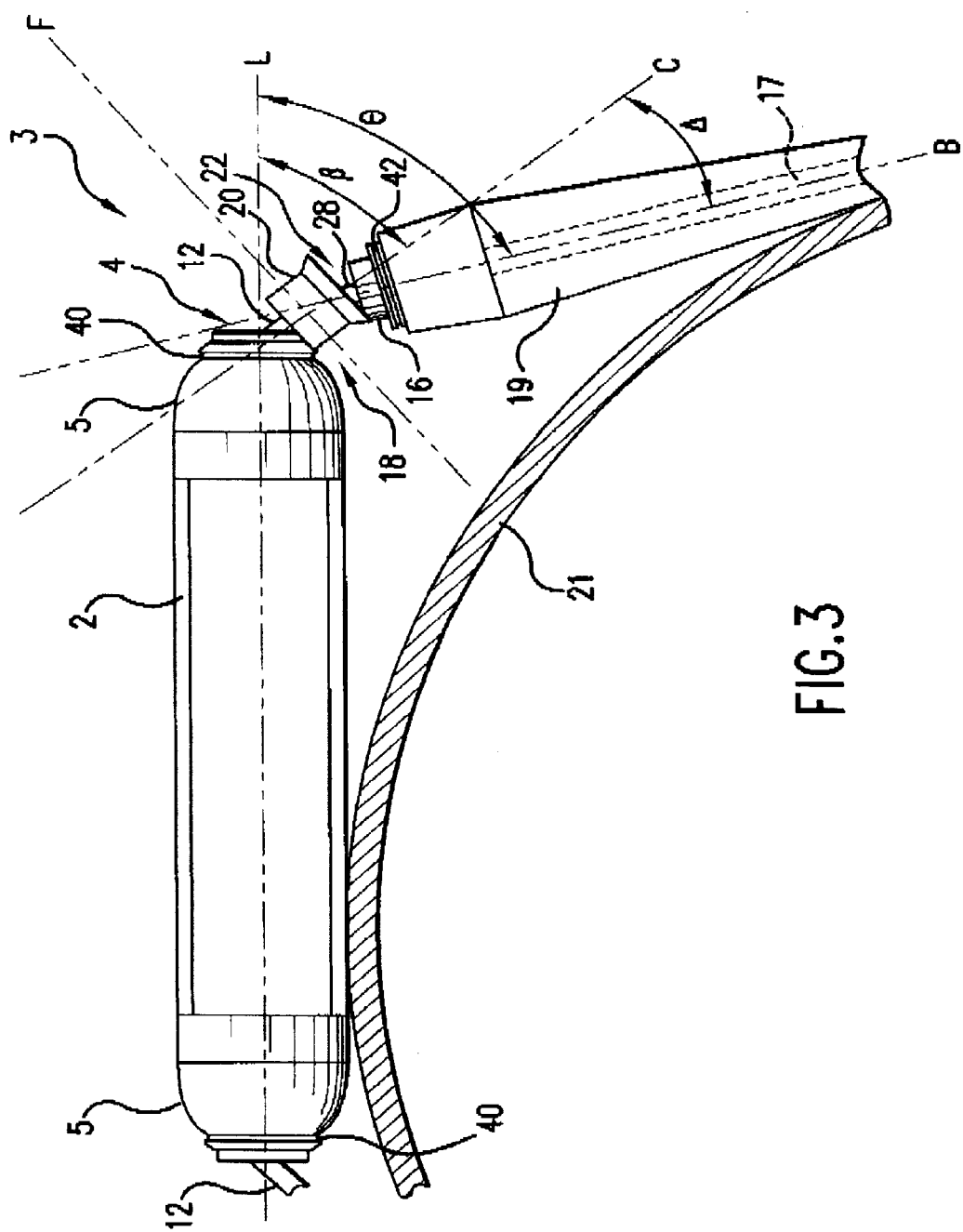
FIG. 3 is a diagrammatic elevation view of the connecting joint of FIG. 2, showing the cable repeater, connecting joint and length of cable wrapped around a drum.

Coupling 18 includes a substantially cylindrical housing 20 having a longitudinal axis C and a gimbal 22 secured therein. As can be seen in FIG. 3, longitudinal axis C of coupling 18 is also the longitudinal axis C of first connecting link 12. Gimbal 22 includes a ring 24 pivotally connected to housing 20 by a pivot axis structure, preferably a pair of coaxial pins 26, only one of which is visible, positioned on opposite sides of housing 20 and ring 24. The common axes F of pins 26 extend perpendicular to longitudinal axis C. A second connecting link 28 is pivotally connected at a first end thereof to ring 24 by a pivot axis structure, preferably a pair of coaxial pins 30, only one of which is visible. Each pin 30 extends through ring 24 into second connecting link 28, the two pins 30 being on opposite sides of ring 24. The common axes G of pins 30 extend perpendicular to the common axes F of pins 26, and pins 30 move in a plane perpendicular to the axes G of pins 30 as ring 24 rotates about pins 26. Second connecting link 28 is secured at a second end thereof to bend limiting device 16. Bend limiting device 16 encloses an end of a length of cable 17, with the optical fibers of the cable 17 extending therefrom and to the repeater 2. As seen in FIG. 3, the bend limiting device 16, the housing 20 of the gimbal 22, and an external load bearing surface on the repeater 2, such as on ring 6, are designed to effectively absorb and transfer tensile forces and to limit the bending of the optical fibers (not shown). A boot 19, preferably formed of rubber and seen more clearly in FIG. 3, extends from bend limiting device 16 partially along the length of cable 17. A bend limiting boot assembly refers to the boot 19 and any bend limiting devices 16 or surfaces associated with the boot.

The improved bending capability of connecting joint 3 is seen more clearly in FIG. 3, where repeater 2, connecting joint 3, bend limiting device 16 and cable 17 are shown wrapped around a drum 21. Gimbal 4 provides a maximum bend angle β between longitudinal axis L of repeater 2 and longitudinal axis C of coupling 18 of up to approximately 50°. Gimbal 22 provides a maximum bend angle Δ between longitudinal axis C of coupling 18 and longitudinal axis B of bend limiting device 16 of up to approximately 25°. Thus, the total maximum bend angle θ for connecting joint 3, that is, the maximum bend angle between the longitudinal axis L of repeater 2 and the longitudinal axis B of bend limiting device 16 is up to approximately 75°. This provides a much greater amount of flexibility for wrapping lengths of cable with in-line repeaters around the drum than prior art devices, reducing stress and possible breakage and degradation of the optical cable.

In a preferred embodiment, connecting links 12, 28 are preferably formed any suitable corrosion resistant, high-strength material such as coated steel or beryllium-copper to provide protection for the fibers carried therein and to transfer and absorb high tensile forces. Further, this connecting joint 3 reduces the concentration of maximum stress as compared to the prior art connection joint of FIG. 1 as the stress forces between the repeater 2 and the boot 19 are distributed over two points as opposed to being concentrated solely at a single point. Additionally, by providing connecting joint 3 with two gimbals 4 and 22, the joint advantageously prevents twisting of joint 3 and connecting fibers (not shown) while still allowing angular movement in two mutually perpendicular directions. It is also recognized that the two gimbal joints 4 and 22 need not be used and a single axis pivoting joint may be used instead of either of the gimbals 4 and 22. Such would still maintain a dual, spaced, pivot axis arrangement.

In a preferred embodiment, the ends of repeater 2 and bend limiting device 16 are provided with grooves 40, 42, respectively. A flexible bellows (not shown) may be used to cover connecting joint 3, with grooves 40, 42 receiving respective flanges or shoulders of the flexible bellows. Suitable fasteners, such as clamps, may then be used to secure the bellows to repeater 2 and bend limiting device 16.

While the maximum bend angle values of β, Δ, and θ listed above correspond to one preferred embodiment, advantages of the present invention can be achieved with other contemplated bend angle values. For example, it is contemplated that the total maximum bend angle θ can be any one of numerous angles, including all angles between 50°–100°, such as 55°, 60°, 65°, 70°, 75°, and 80°, and still obtain significant advantages over the prior art. Further, it is also contemplated that the maximum bend angle Δ between the longitudinal axis B of the boot 19 and the longitudinal axis C of the gimbal 22 need not be less than that of the maximum bend angle β between the longitudinal axis L of the repeater 2 and the longitudinal axis C the gimbal 22, and the values of each of the maximum bend angle Δ and β may be any positive angle.

In light of the foregoing disclosure of the invention and description of the preferred embodiments, those skilled in this area of technology will readily understand that various modifications and adaptations can be made without departing from the scope and spirit of the invention. All such modifications and adaptations are intended to be covered by the following claims.

What is claimed is:

1. A connector for connecting an optical fiber repeater to a length of optical fiber cable, comprising:
    a first gimbal, said first gimbal attached to an end of the repeater;
    a coupling, said coupling having a second gimbal;
    a first connecting link, said first connecting link attached at a first end thereof to said first gimbal and attached to the second end thereof to said coupling;
    a second connecting link, said second connecting link attached at a first end thereof to said second gimbal and attached at a second end thereof to a portion of the cable segment;
    wherein one of said first gimbal and said second gimbal includes first and second axes of rotation that are perpendicular to one another, and the other of said first gimbal and said second gimbal includes at least one axis of rotation being substantially parallel to the first axis of rotation of said one of said first gimbal and said second gimbal.

2. The connector according to claim 1, wherein said first joint includes:
    a first ring secured to the repeater;
    a second ring pivotally connected to the first ring by a first pivot axis structure; and
    a second pivot axis structure secured to the second ring, the second pivot axis structure pivotally connecting the first connecting link to the second ring.

3. The connector according to claim 2, wherein the first pivot axis structure of the first joint comprises a pair of spaced-apart coaxial pins opposite one another on the first and second rings, and the second pivot axis structure of the first joint comprises a pair of coaxial pins opposite one another on the second ring.

4. The connector according to claim 1, wherein the second joint comprises a coupling ring pivotally secured to the coupling by a first coupling pivot axis structure, the second connecting link pivotally connected to the coupling ring by a second coupling pivot axis structure.

5. The connector according to claim 4, wherein the first pivot axis structure of the second joint comprises a pair of coaxial pins opposite one another on the coupling.

6. The connector according to claim 5, wherein the second pivot axis structure of the second joint comprises a pair of coaxial pins opposite one another on the coupling ring.

7. The connector according to claim 1, wherein said first and second connecting links are hollow permitting fibers to extend therethrough.

8. A connector for connecting a cable repeater to an end portion of an optical fiber cable segment, comprising:
    a first gimbal, said first gimbal being coupled to said repeater;
    a second gimbal, said second gimbal being spaced from said first gimbal;
    a first connecting link coupled at a first end thereof to the first gimbal and coupled at a second end thereof to the second gimbal; and
    a second connecting link coupled at a first end thereof to the second gimbal and coupled at a second end thereof to a portion of the optical fiber cable segment;
    wherein said first gimbal permits relative pivotal movement between the first connecting link and the repeater about two axes and said second gimbal permits relative pivotal movement between the first connecting link and the second connecting link about two axes.

9. The connector according to claim 8, further comprising a bend limiting device secured to and encompassing a portion of the optical fiber cable segment, the second connecting link being secured at its second end to the bend limiting device.

10. The cable system according to claim 9, further comprising a boot surrounding the bend limiting device and extending along the length of optical fiber cable segment.

11. The connector according to claim 8, wherein said first and second connecting links comprise hollow members configured to carry fibers from the end portion of the optical fiber cable segment to the repeater.

12. The connector according to claim 11, wherein each of the first and second gimbals includes first and second pairs of spaced apart pivot pins providing an opening therebetween enabling optical fibers to extend through said openings.

13. The connector according to claim 8, wherein said first and second gimbals providing relative motion between a longitudinal axis of the repeater and a longitudinal axis of the optical fiber cable in excess of 55°.

14. The connector according to claim 13, wherein the bend angle of the first gimbal as measured between a longitudinal axis of the repeater and a longitudinal axis of the first connecting link is limited to approximately 50° or less and the bend angle of the second gimbal as measured between a longitudinal axis of the first connecting link and a longitudinal axis of the optical fiber cable is limited to approximately 50° or less.

15. The connector according to claim 13, wherein second gimbal provides relative motion between a longitudinal axis of the first connecting link and a longitudinal axis of the optical fiber cable in excess of 20°.

16. The connector according to claim 8, wherein the first and second gimbals provide for a bend angle of up to approximately 75° between a longitudinal axis of the repeater and a longitudinal axis of the cable.

17. A fiber optical cable network system comprising:
   a plurality of repeaters, each repeater having a repeater gimbal at each end thereof;
   a plurality of couplings, each coupling having a coupling gimbal therein;
   a plurality of fiber optic cable segments;
   a plurality of first connecting links, each first connecting link pivotally connected at a first end thereof to a respective repeater gimbal and secured at a second end thereof to a respective coupling;
   a plurality of bend limiting boot assemblies, each bend limiting boot assembly enclosing a portion of an end of a respective fiber optic cable segment; and
   a plurality of second connecting links, each second connecting link pivotally connected at a first end thereof to a respective coupling gimbal and secured at a second end thereof to a respective bend boot assembly.

18. The cable system according to claim 17, wherein said first and second connecting links each comprises a hollow member configured to carry optical fibers from a respective repeater to a respective fiber optic cable segment.

19. The connector according to claim 17, wherein each of a corresponding repeater gimbal and coupling gimbal together provide for a bend angle in excess of 55° between a longitudinal axis of the repeater and a longitudinal axis of a corresponding bend limiting boot assemblies.

20. The connector according to claim 19, wherein the bend angle of each repeater gimbal as measured between a longitudinal axis of its respective repeater and a longitudinal axis of its respective first connecting link is limited to approximately 50° or less and the bend angle of each couple gimbal as measured between a longitudinal axis of its respective first connecting link and a longitudinal axis of its respective optical fiber cable segment is limited to approximately 50° or less.

21. The connector according to claim 17, wherein coupling gimbal provides relative motion between a longitudinal axis of its respective first connecting link and a longitudinal axis of its respective optical fiber cable segment in excess of 20°.

* * * * *